United States Patent [19]
Lee et al.

[11] Patent Number: 5,585,956
[45] Date of Patent: Dec. 17, 1996

[54] ELECTROSTRICTIVE ACTUATED MIRROR ARRAY

[75] Inventors: Seok-Won Lee; Myoung-Jin Kim, both of Seoul, Rep. of Korea

[73] Assignee: Daewoo Electronics Co, Ltd., Seoul, Rep. of Korea

[21] Appl. No.: 282,943

[22] Filed: Jul. 29, 1994

[30] Foreign Application Priority Data

Jul. 31, 1993 [KR] Rep. of Korea ............... 1993-14909
Sep. 23, 1993 [KR] Rep. of Korea ............... 1993-19456

[51] Int. Cl.⁶ .................... G02B 5/08; G02B 26/08; H01L 41/04; H04R 17/00
[52] U.S. Cl. .................... 359/224; 359/291; 359/295; 359/846; 359/855; 359/900; 310/328; 310/366; 29/25.35
[58] Field of Search .................... 359/223, 224, 359/225, 846, 847, 848, 850, 291, 295, 849, 855, 900; 310/328, 366; 29/25.35

[56] References Cited

U.S. PATENT DOCUMENTS

| | | | |
|---|---|---|---|
| 4,248,504 | 2/1981 | Albertinetti et al. | 359/295 |
| 4,662,746 | 5/1987 | Hornbeck | 359/223 |
| 4,707,081 | 11/1987 | Mir | 359/323 |
| 4,793,699 | 12/1988 | Tokuhara | 359/223 |
| 5,061,049 | 10/1991 | Hornbeck | 359/224 |
| 5,083,857 | 1/1992 | Hornbeck | 359/224 |
| 5,085,497 | 2/1992 | Um et al. | 359/848 |
| 5,159,225 | 10/1992 | Um | 310/328 |
| 5,170,283 | 12/1992 | O'Brien et al. | 359/224 |
| 5,193,256 | 3/1993 | Ochiai et al. | 29/25.35 |
| 5,212,582 | 5/1993 | Nelson | 359/224 |
| 5,245,464 | 9/1993 | Jensen | 359/223 |
| 5,469,302 | 11/1995 | Lim | 359/291 |
| 5,506,720 | 4/1996 | Yoon | 359/224 |

*Primary Examiner*—Ricky D. Shafer
*Attorney, Agent, or Firm*—Anderson Kill & Olick P.C.

[57] ABSTRACT

An array of M×N electrostrictive actuated mirrors for use in an optical projection system manufactured using the inventive method, comprising: an active matrix including a substrate and an array of M×N connecting terminals thereon; an array of M×N electrostrictive actuators, wherein each of the actuators includes an electrostrictive member having a top and a bottom surfaces, the top surface being separated by a trench thereby creating first top surface and a second top surface, a first electrode located on the bottom surface, a pair of second electrodes, each of the of second electrodes placed on the first and second top surfaces, respectively, and a pair of insulating layers, each covering the first and second top surface, respectively, including the second electrode placed thereon; an array of M×N hinges, wherein each of the M×N hinges is provided with a flat top surface and a bottom surface having a protrusion mounted on the top of each actuators; an array of M×N connecting terminals, wherein each of the connecting terminals is used for electrically connecting each of the first electrodes with the active matrix; and an array of M×N mirrors, wherein each of the M×N mirrors is mounted on the top surface of each of the M×N hinges.

15 Claims, 8 Drawing Sheets

ELECTROSTRICTIVE ACTUATED MIRROR ARRAY

FIELD OF THE INVENTION

The present invention relates to an optical projection system; and, more particularly, to an array of electrostrictive actuated mirrors and an improved method for manufacturing same for use therein.

BACKGROUND OF THE INVENTION

Among the various video display systems available in the art, an optical projection system is known to be capable of providing a high quality video display in a large scale. In such an optical projection system, light from a lamp is uniformly illuminated onto an array of, e.g., M×N, actuated mirrors such that each of the mirrors is coupled with each of the actuators. The actuators may be made of an electrodisplacive material such as a piezoelectric or an electrostrictive material which deforms in response to an electric field applied thereto.

The reflected light beam from each of the mirrors is incident upon an aperture. By applying an electrical signal to each of the actuators, the relative position of each of the mirrors to the incident light beam is altered, thereby causing a deviation in the optical path of the reflected beam from of the mirrors. As the optical path of each of the reflected beams is varied, the amount of light reflected from each of the mirrors which passes through the aperture is changed, thereby modulating the intensity of the beam. The modulated beams through the aperture are transmitted onto a projection screen via an appropriate optical device such as a projection lens, to thereby display an image thereon.

Figure 1:
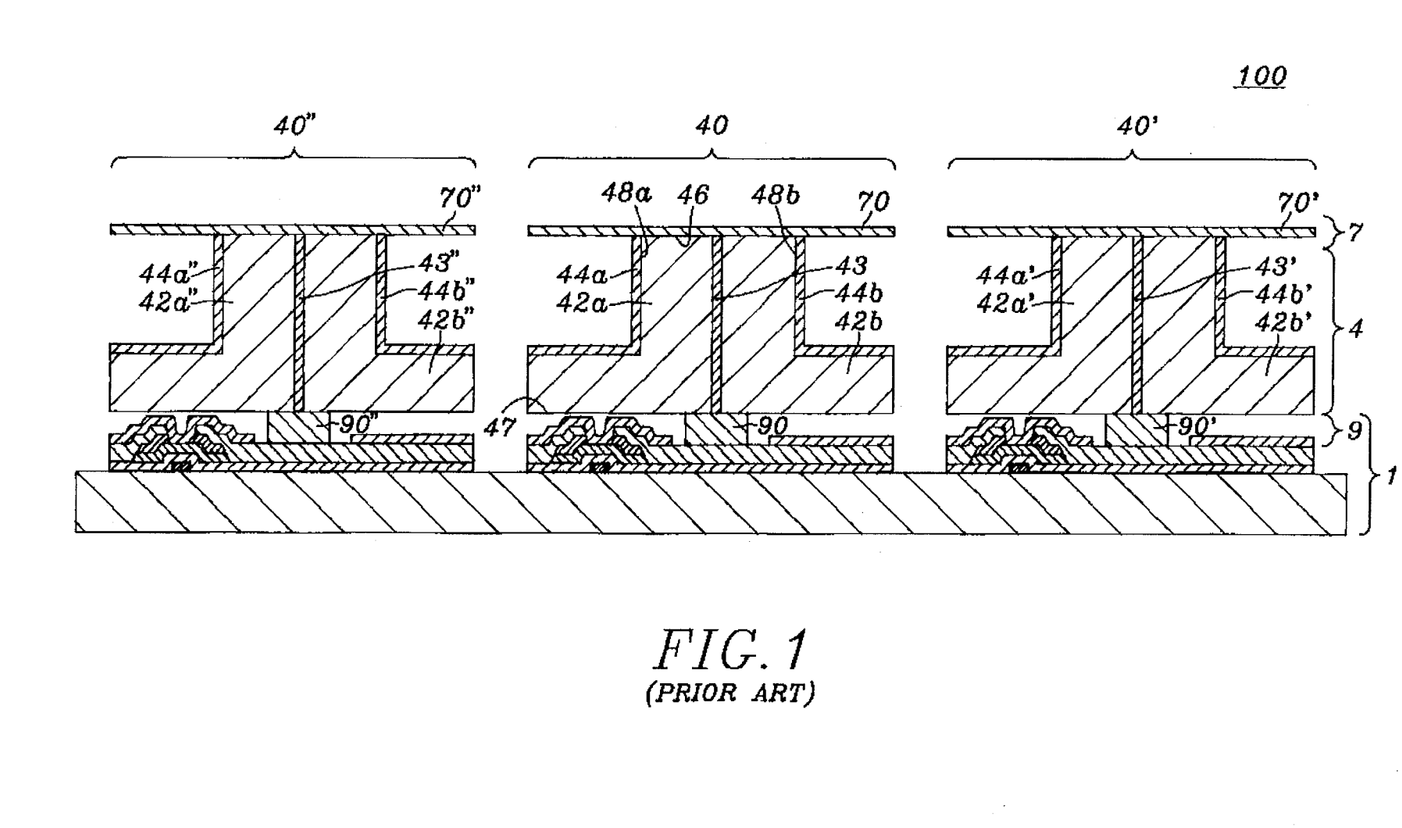
FIG. 1 shows a cross sectional view of a prior art array of M×N electrodisplacive actuated mirrors.

In FIG. 1, there is shown a cross sectional view of an array of M×N electrodisplacive actuated mirrors 100 disclosed in a copending, commonly owned application, U.S. Ser. No. 08/239,891, entitled "PIEZOELECTRIC ACTUATOR ARRAY AND METHOD FOR THE MANUFACTURE THEREOF", wherein M and N are integers, comprising an active matrix 1, an array 4 of M×N actuators, e.g., 40, 40', 40", a corresponding array 7 of M×N mirrors, e.g., 70, 70', 70"and a corresponding array 9 of M×N connecting terminals, e.g., 90, 90', 90". Each of the actuators, e.g., 40, in turn, is provided with a top surface 46, a bottom surface 47, and a pair of external sides 48a, 48b; and has a bimorph structure, comprising a pair of electrodisplacive members 42a, 42b, a common signal electrode 43 located between the pair of electrodisplacive members 42a, 42b and a pair of reference electrodes 44a, 44b on the pair of external sides 48a, 48b of the actuator 40, respectively (as all of the actuators, e.g., 40, 40', 40", are essentially identical, the following description will be given with respect to a representative actuator 40).

The electrodisplacive members 42a, 42b are comprised of an electrodisplacive material such as a piezoelectric material, e.g., lead zirconium titanate (PZT), or an electrostrictive material, e.g., lead magnesium niobate-lead titanate(PMN-PT).

The bottom surface 47 of the actuator 40 is mounted on the active matrix 1; and a mirror 70 is mounted on the top surface 46 of the actuator 40. Further, a connecting terminal 90 is used for electrically connecting the common signal electrode 43 in the actuator 40 to the active matrix 1.

When a voltage is applied between the common signal electrode 43 and the reference electrodes 44a, 44b, the electrodisplacive material located therebetween will deform in a direction determined by the polarity of the voltage.

In a copending, commonly owned application, U.S. Ser. No. 08/216,754, entitled "ACTUATOR ARRAY AND METHOD FOR THE MANUFACTURE THEREOF", there is disclosed a method for manufacturing such an array of M×N electrodisplacive actuators for use in the above-described optical projection system, the method comprising the steps of:

(1) forming a multilayered ceramic structure having M layers of a first conductive metallization and M+1 layers of an electrodisplacive material, wherein each layer of the first conductive metallization is placed between two layers of the electrodisplacive material;

(2) obtaining a composite ceramic wafer by slicing the multilayered ceramic structure in a direction normal to the layers of the first conductive metallization;

(3) providing a plurality of regularly spaced horizontally directional trenches running parallel to each other using mechanical means, e.g., sawing, wherein each of the trenches is located at an equidistance from two adjacent layers of the first conductive metallization;

(4) depositing a second conductive metallization; and (5) preparing N−1 regularly spaced vertically directional cuts on the composite ceramic wafer prepared using steps(3) and (4) to thereby obtain the array of M×N electrodisplacive actuators.

The first and the second conductive metallizations serve as the common signal electrode, e.g., 43, and the reference electrodes, e.g., 44a, 44b, in the completed actuated mirror array, respectively.

There is a number of problems associated with the above-described methods for manufacturing an array of M×N electrodisplacive actuators, however. First of all, the first conductive metallization, which will serve as the common signal electrode 43 in the completed actuated mirror array, may be deformed or bend during the sintering process involved in the preparation of the multilayered ceramic structure, which may, in turn, make it difficult to form dimensionally correct trenches and, hence, the actuators. Another problem present in the above method is that, for the first conductive metallization, it requires expensive electrode materials having high melting points such as platinum (Pt) or palladium (Pd) so as for the first conductive metallization to withstand an extremely high sintering temperature, e.g., 1,250° C. or higher. Since the array of M×N electrodisplacive actuators is manufactured using mechanical means, e.g., sawing, it may be difficult to obtain the desired reproducibility, reliability and yield in the manufacturing of the M×N electrodisplacive actuated mirrors; and, furthermore, there may be a limit to the down sizing thereof.

SUMMARY OF THE INVENTION

It is, therefore, a primary object of the present invention to provide a method for manufacturing an array of M×N electrostrictive actuated mirrors which dispenses with the use of a multilayered electrostrictive ceramic structure, wherein M and N are integers, M indicating the total number of columns in the array, running parallel to the vertical direction and N, the total number of rows therein, running parallel to the horizontal direction, respectively.

It is another object of the present invention to provide an improved method for manufacturing in a high yield an array of M×N electrostrictive actuated mirrors of a higher reproducibility and reliability.

In accordance with one aspect of the present invention, there is provided an improved method for manufacturing an array of M×N electrostrictive actuated mirrors, comprising the steps of:

(a) preparing a ceramic wafer, made of an electrostrictive material, having a top and a bottom surfaces;

(b) forming an array of M×N regularly spaced, identically sized first electrodes on the bottom surface of said ceramic wafer and a set of 2×(M+1) identically sized second electrodes on the top surface thereof, wherein each of the 2×(M+1) second electrodes, having a pair of side edges running parallel to each other and to the vertical direction, extends vertically across the top surface, and each of the M×N first electrodes, when projected onto the top surface, includes two adjacent second electrodes and the centerline thereof coincides with the centerline therebetween;

(c) mounting said ceramic wafer treated in accordance with said step (b) on an active matrix, including a substrate, an array of M×N transistors and an array of M×N connecting terminals to thereby connect each of the first electrodes with each of the M×N connecting terminals;

(d) covering the top surface of said ceramic wafer, including the 2×(M+1) second electrodes, treated in accordance with said steps (b) and (c) with an insulating layer;

(e) providing a set of (M+1) photoresistive necked segments on top of the insulating layer covering the top surface of said ceramic wafer, including the 2×(M+1) second electrodes, each of the photoresistive necked segments, extending in the vertical direction, is placed on a portion of the insulating layer covering a pair of second electrode, wherein the pair of second electrodes, when projected onto the bottom surface, is made up of two neighboring second electrodes from two horizontally adjacent first electrodes;

(f) forming a set of M trenches, wherein each of the M trenches, provided with a pair of side surfaces and a bottom surface, is located between two adjacent second electrodes, the centerline thereof coinciding with the centerline of each of the first electrodes on the same column and the centerline between the two adjacent second electrodes, runs parallel to the second electrodes, and is further provided with a set of N−1 grooves, running perpendicular thereto;

(g) removing the photoresistive necked segments;

(h) placing an array of M×N hinges on the top surface of said ceramic wafer treated in accordance with said steps (b), (c), (d), (e), (f) and (g), wherein each of the M×N hinges is provided with a top surface and a bottom surface provided with a protrusion mounted simultaneously on the insulating layers covering the two adjacent second electrodes separated by a trench therebetween;

(i) forming a mirror on the top surface of each of the M×N hinges; and (j) making appropriate electrical connections to thereby form an array of M×N electrodisplacive actuated mirrors.

In accordance with another aspect of the present invention, there is provided an array of M×N electrostrictive actuated mirrors having a novel structure for use in an optical projection system, comprising:

an active matrix including a substrate, an array of M×N transistors and an array of M×N connecting terminals thereon;

an array of M×N electrostrictive actuators, wherein each of the M×N electrostrictive actuators includes an electrostrictive member having a top and a bottom surfaces, a first electrode, a pair of second electrodes, each of the second electrode having a pair of side edges running parallel to each other and to the vertical direction, and a pair of insulating layers, the top surface of the electrostrictive member being evenly separated by a trench having a pair of side surfaces and a bottom surface formed thereon and running vertically across the top surface, thereby creating a first actuating member having a first top surface and a second actuating member having a second top surface, the first electrode being located on the bottom surface thereof, each of the second electrodes being located on and partially covering the first top surface and the second top surface, with one of the side edges thereof coinciding with the side surface of the trench, and each of the pair of insulating layers covering the first and second top surfaces of the actuating members, including the second electrode placed thereon;

an array of M×N hinges, wherein each of the M×N hinges is provided with a flat top surface and a bottom surface having a protrusion mounted on the top of each of the M×N electrodisplacive actuators;

an array of M×N connecting terminals, wherein each of the connecting terminals is used for electrically connecting each of the first electrodes with the active matrix; and an array of M×N mirrors, wherein each of the M×N mirrors is mounted on the top surface of each of the M×N hinges.

BRIEF DESCRIPTION OF THE DRAWINGS

The above and other objects and features of the present invention will become apparent from the following description of preferred embodiments given in conjunction with the accompanying drawings, wherein.

DETAILED DESCRIPTION OF THE PREFERRED EMBODIMENTS

Figure 2A:
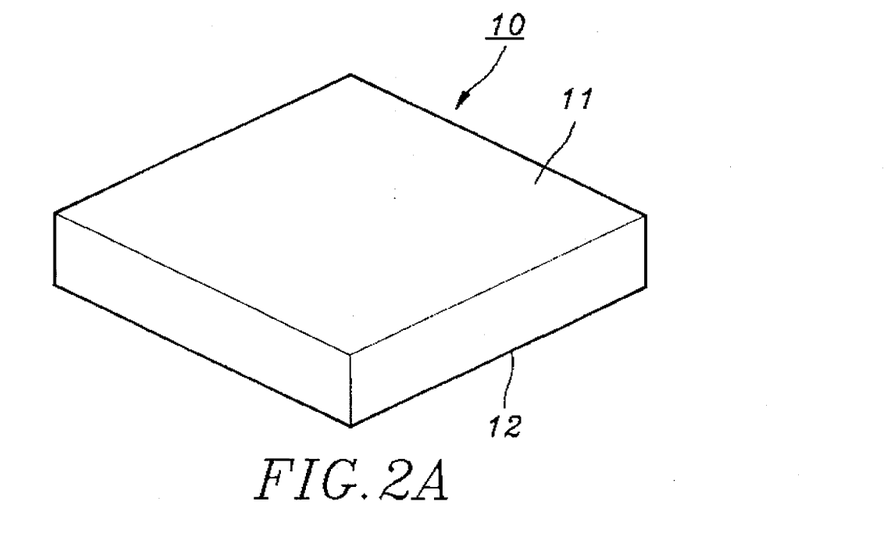
FIGS. 2A to 2G illustrate the steps used in constructing an inventive array of M×N electrostrictive actuated mirrors.

In accordance with the present invention, the process for manufacturing the inventive array of M×N electrostrictive actuated mirrors, wherein M and N are integers, M indicating the total number of column in the array, running parallel to the vertical direction and N, the total number of rows therein, running parallel to the horizontal direction, respectively, begins with the preparation of a ceramic wafer 10, as shown in FIG. 2A, made of an electrostrictive material, e.g., lead magnesium niobate-lead titanate(PMN-PT) and having a top and a bottom surfaces 11, 12, wherein the top and the bottom surfaces, 11, 12, are flat and parallel to each other.

Figure 2B:
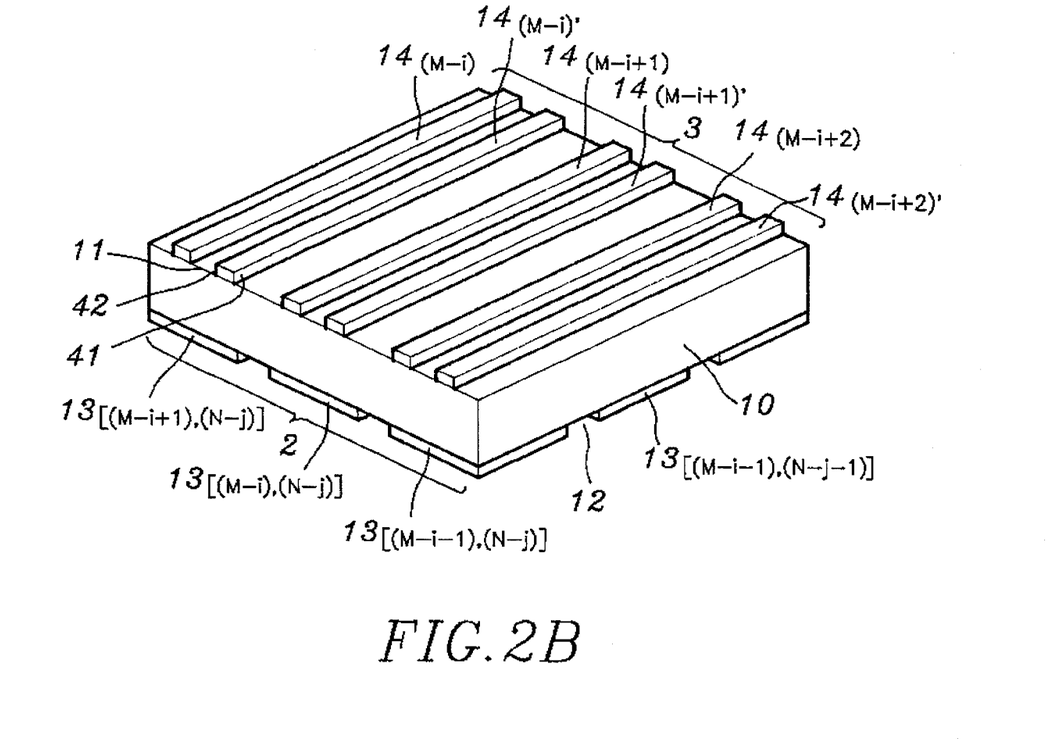

As shown in FIG. 2B, on the bottom surface 12 of the ceramic wafer 10, there is formed an array 2 of M×N regularly spaced, identically sized first electrodes, e.g., $13_{[(M-i+1), (N-j)]}$, $13_{[(M-i), (N-j)]}$, $13_{[(M-i-1), (N-j)]}$, and on the top surface 11 thereof, a set 3 of 2×(M+1) identically sized second electrodes, e.g., $14_{(M-i)}$, $14_{(M-i)}$, $14_{(M-i+1)}$, $14_{(M-i+1)}$, wherein i and j are integers, and i and j are less than or equal to M−1 and N−1, respectively. Each of the 2×(M+1) second electrodes, e.g., $14_{(M-i)}$, has a pair of side edges 41, 42, running parallel to each other and to the vertical direction. Further, each of the second electrodes extends vertically across the top surface 11 of the ceramic wafer 10 in the vertical direction, runs parallel to each other. Each of the M×N first electrodes, e.g., $13_{[(M-i),(N-j)]}$ is placed in such a way that, when projected onto the top surface 11, it includes two adjacent second electrodes $14_{(M-i+1)}$, $14_{(M-i+1)'}$ and the centerline thereof in the vertical direction coincides with the centerline between the two adjacent second electrodes.

The array 2 of M×N first electrodes, e.g., $13_{[(M-i),(N-j)]}$ and the set 3 of 2×(M+1) second electrodes, e.g., $14_{M-i+1}$ are obtained by covering the entire top and bottom surfaces 11, 12 with a conductive metallization, e.g., Al, Cu or Ni, using, e.g., a sputtering method, and then obtaining the required electrode pattern using a photolithography method.

Figure 2C:
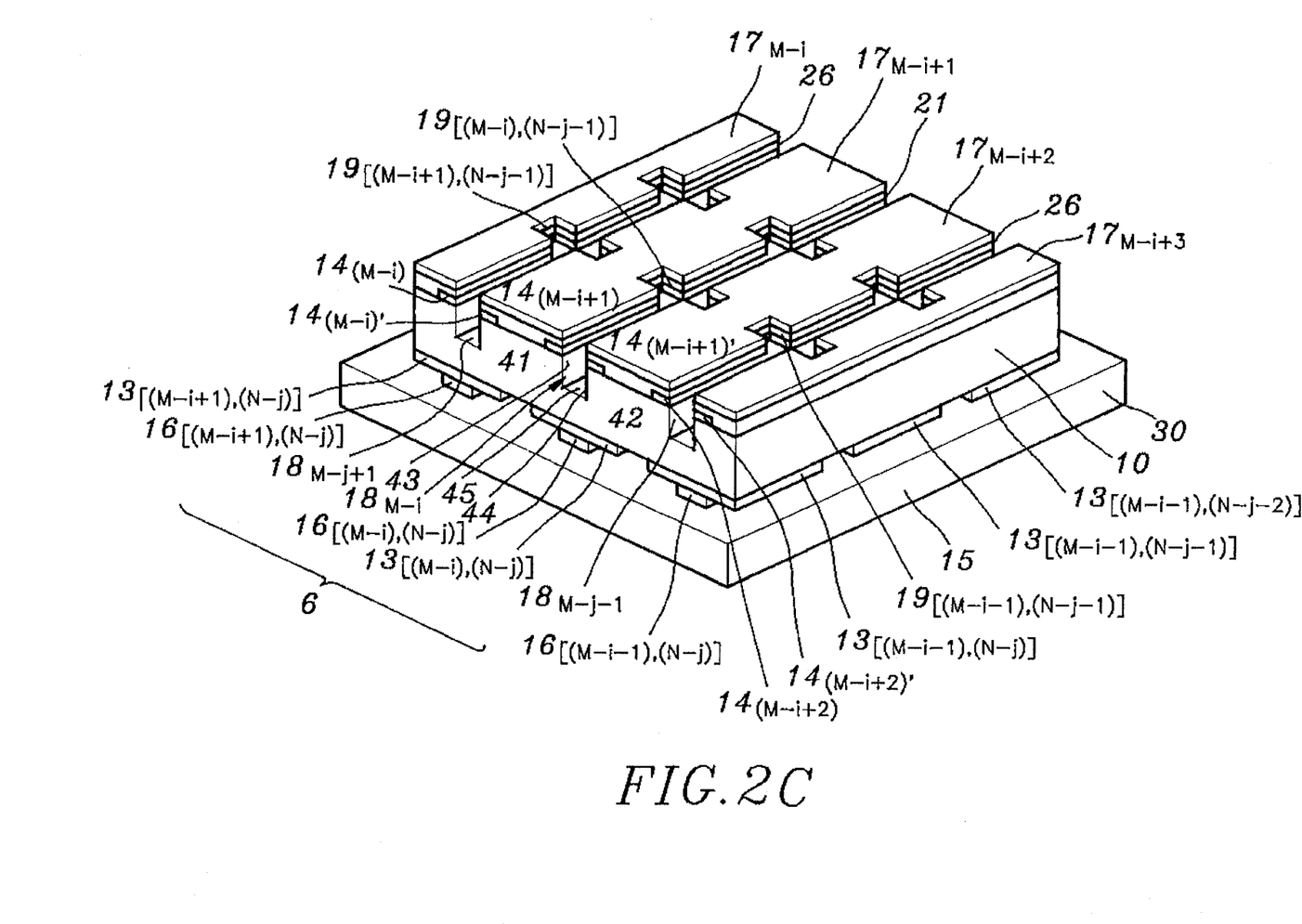

Thereafter, the ceramic wafer 10 treated in accordance with the above-described steps is mounted, as shown in FIG. 2C, on an active matrix 15, including a substrate 30, made of an insulating material, e.g., $Al_2O_3$, or glass, or a semiconductor, e.g., Si, an array of M×N transistors (not shown) and an array 6 of M×N connecting terminals, e.g., $16_{[(M-i+1),(N-j)]}$, $16_{[(M-i),(N-j)]}$, $16_{[(M-i-1),(N-j)]}$ thereon. Each of the M×N connecting terminals, e.g., $16_{[(M-i),(N-j)]}$, electrically connected with each of the M×N first electrodes, e.g., $13_{[(M-i),(N-j)]}$, using a conductive adhesive.

Subsequently, the top surface 11 of the ceramic wafer treated in accordance with the above described steps, including the 2×(M+1) second electrodes, is covered with an insulating layer 26, made of either an oxide or a nitride.

Thereafter, a set of (M+1) photoresistive necked segments is placed on top of the insulating layer 26 in such a way that each of the photoresistive necked segments, e.g., $17_{(M-i+1)}$, extending in the vertical direction, covers a portion of the insulating layer 26 covering a pair of second electrodes $14_{(M-i)}$, $14_{(M-i+1)}$, wherein each of the pair of second electrodes, when projected to the bottom surface 12, overlaps each of two horizontally adjacent first electrodes $13_{[(M-i+1),(N-j)]}$, $13_{[(M-i),(N-j)]}$.

In the subsequent step the areas not covered by the (M+1) photoresistive necked segments are removed using an etching method, thereby forming a set of M regularly spaced, identically sized trenches as shown in FIG. 2C, e.g., $18_{M-i}$, $18_{M-i-1}$, $18_{M-i+1}$, running parallel to the second electrodes, wherein the centerline of each trench, e.g., $18_{M-i}$, coincides with the centerlines of the first electrodes on the same column, e.g., $13_{[(M-i),(N-j)]}$, $13_{[(M-i),(N-j+1)]}$, and each trench, e.g., $18_{M-i}$, provided with a pair of side surfaces 43, 44 and a bottom surface 45, is further provided with a set of N−1 equally spaced, identically sized grooves, e.g., $19_{[(M-i),(N-j-1)]}$, $19_{[(M-i),(N-j)]}$, $19_{[(M-i),(N-j+1)]}$, of a fixed length, running perpendicular thereto.

The N−1 grooves are identically placed in all of the M trenches and none of the N−1 grooves in each of the M trenches comes into contact with the grooves in the adjacent trenches. The width and the depth of the M trenches and the M×(N−1) grooves formed are within a range from 5 to 15μm and from 10 to 20μm, respectively. Once the M trenches and the M×(N−1) grooves are formed, the photoresistive necked segments, e.g., $17_{M-i}$, $17_{M-i+1}$, $17_{M-i+2}$, are removed.

Figure 2D:
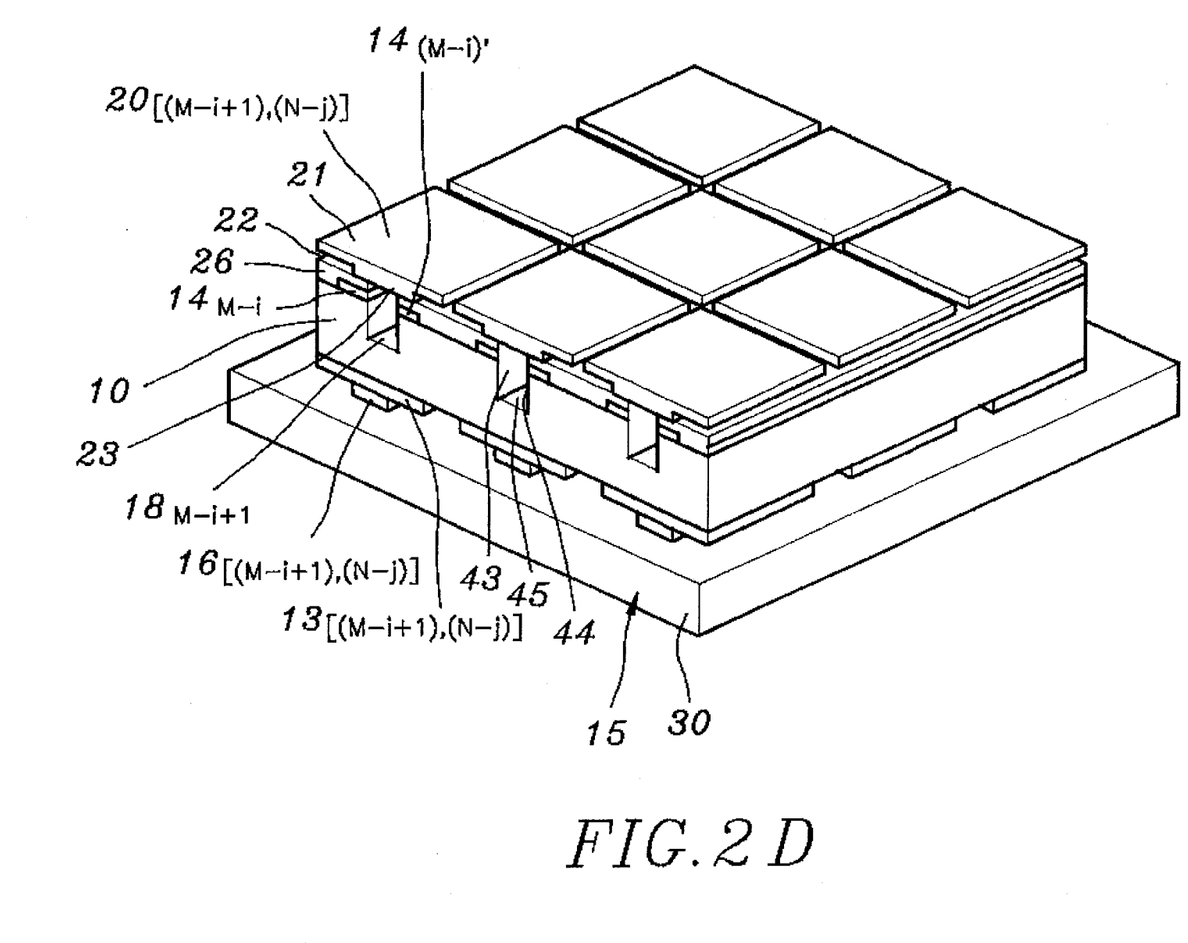
Figure 2E:
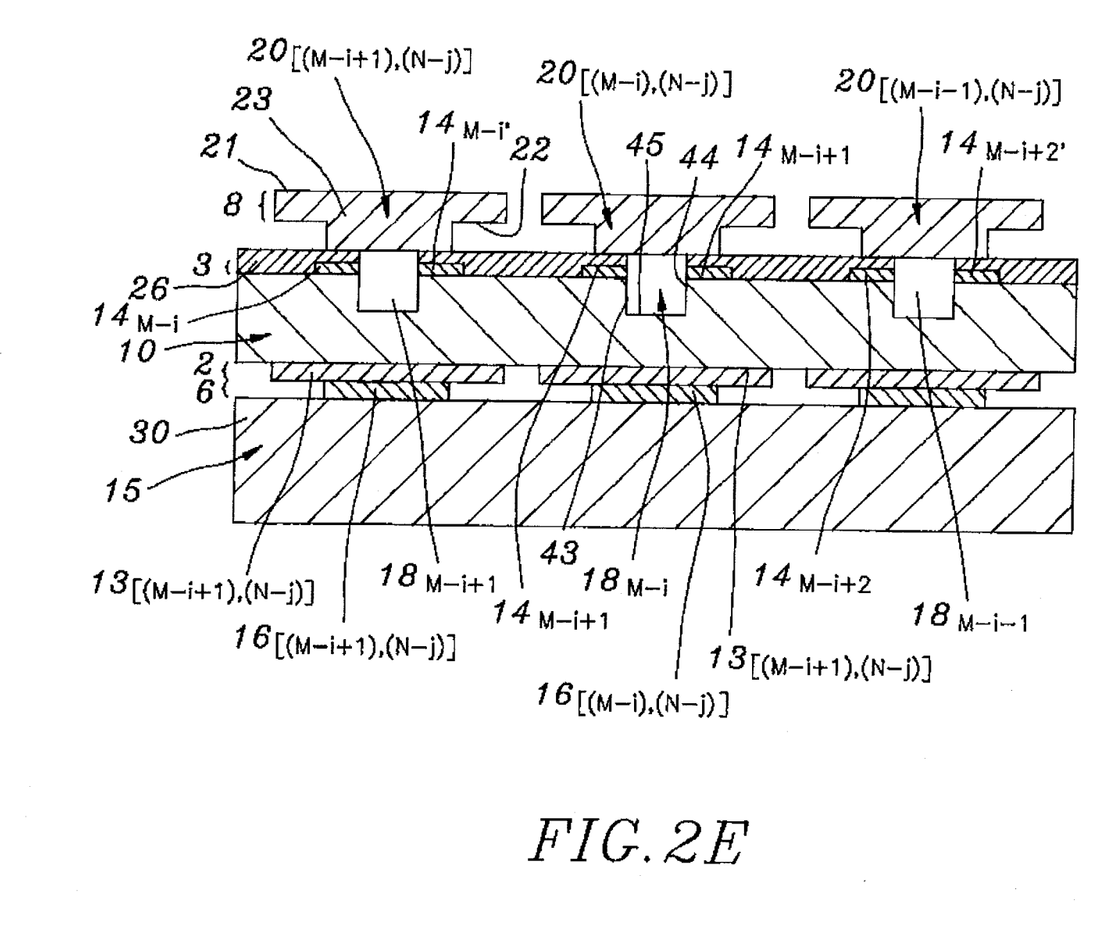

In FIGS. 2D and 2E, there is shown an array 8 of M×N hinges, e.g., $20_{[(M-i+1),(N-j)]}$, $20_{[(M-i),(N-j)]}$, $20_{[(M-i-1),(N-j)]}$, mounted on top of the ceramic wafer 10 treated in accordance with the above-described steps, wherein each of the M×N hinges, e.g., $20_{[(M-i+1),(N-j)]}$, (is provided with a flat top surface 21 and a bottom surface 22 with a protrusion 23 such that the bottom of the protrusion 23 can be mounted simultaneously on the insulating layers 26 covering the corresponding two second electrodes $14_{(M-i)}$, $14_{(M-i)}$, separated by a trench $18_{M-i+1}$ therebetween. The hinges are made of an insulating epoxy which solidifies when exposed to an UV light. FIGS. 2D and 2E illustrate a three dimensional and a cross sectional view, respectively, of the ceramic wafer 10 treated in accordance with the above-described steps.

Figure 2F:
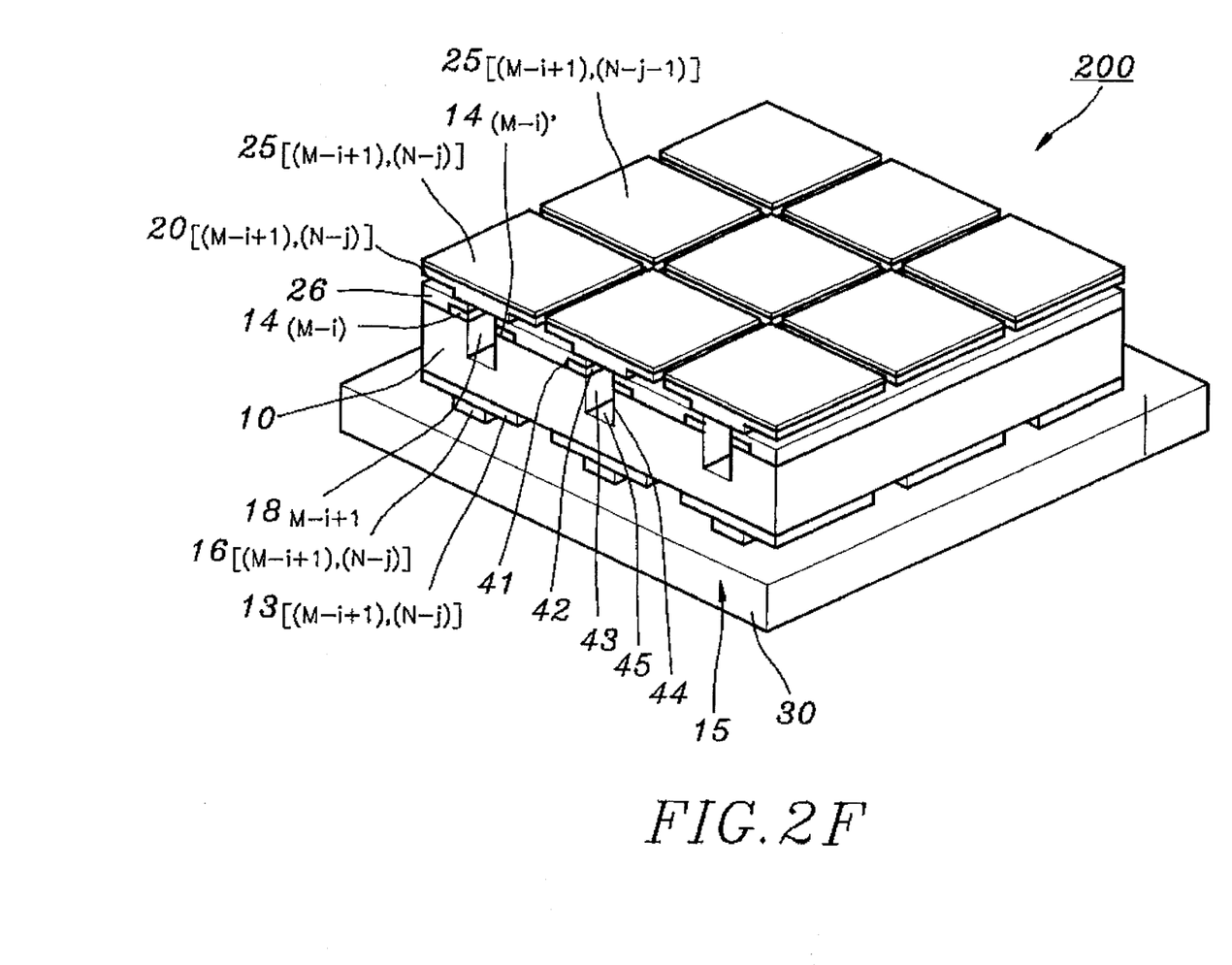
Figure 2G:
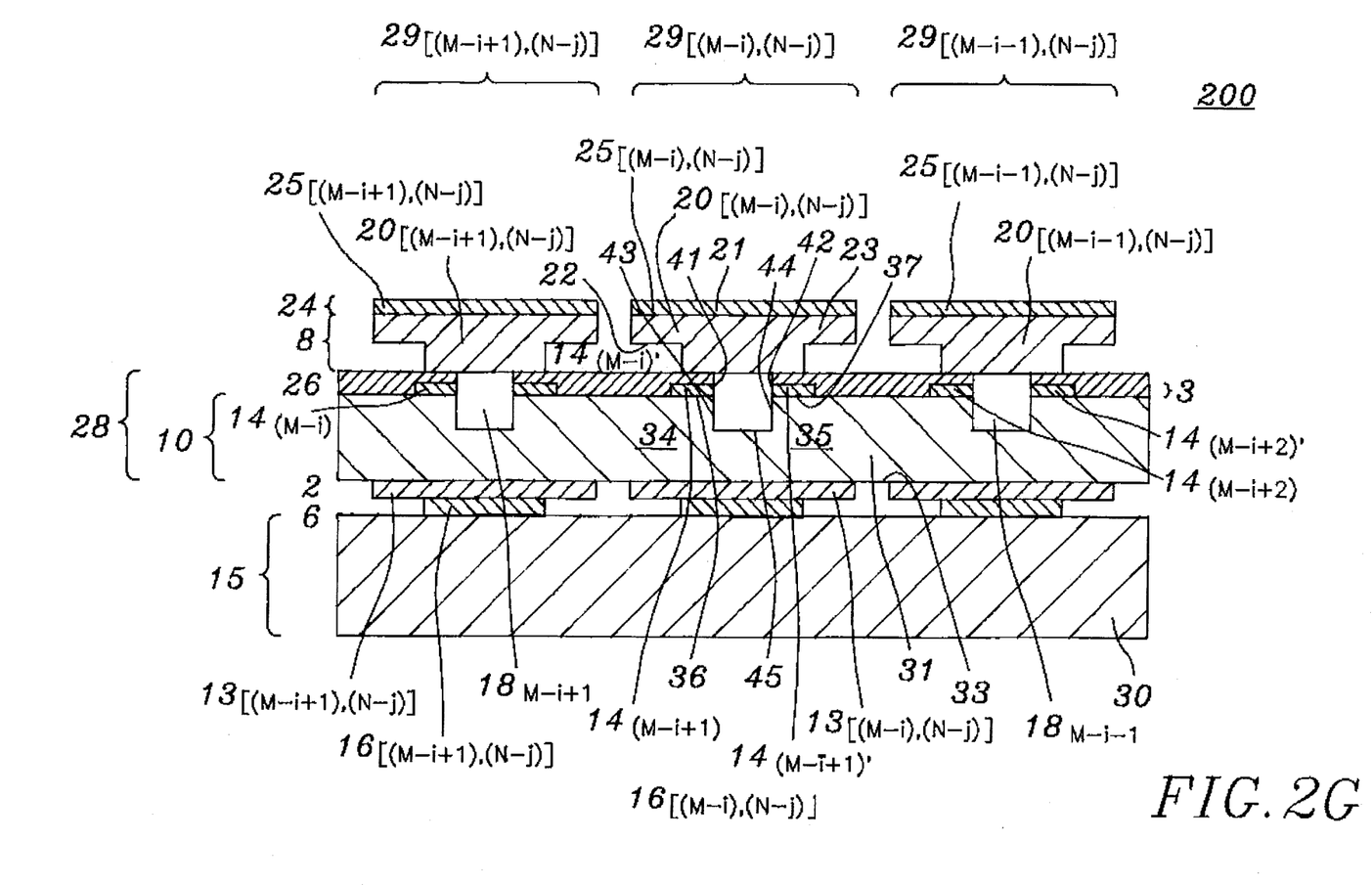

Thereafter, an array 24 of M×N mirrors, e.g., $25_{[(M-i+1),(N-j)]}$, $25_{[(M-i),(N-j)]}$, $25_{[(M-i-1),(N-j)]}$, made of a light reflecting material, e.g., Al, are formed on the top surface 21 of the M×N hinges using such a conventional technique as sputtering method. Furthermore, in order to prevent irregular reflections of the light from the light reflecting surface that might be formed during the sputtering on the areas of the hinges other than the top surface 21, a water soluble separator (not shown) is provided on the exposed region, i.e., the region not covered by the M×N hinges, prior to the sputtering. The separator will be removed afterward. In the subsequent step, appropriate electrical connections are made, thereby forming an array of M×N electrodisplacive actuated mirrors 200 as shown in FIGS. 2F and 2G, wherein FIGS. 2F and 2G depict a three dimensional and a cross sectional views thereof.

The inventive M×N electrostrictive actuated mirror array 200 comprises: an active matrix 15 including a substrate of M×N connecting terminals, e.g., $16_{[(M-i),(N-j)]}$, $16_{[(M-i+1),(N-j)]}$, $16_{[(M-i-1),(N-j)]}$; an array 28 of M×N electrostrictive actuators, e.g., $29_{[(M-i+1),(N-j)]}$, $29_{[(M-i),(N-j)]}$, $29_{[(M-i-1),(N-j)]}$, wherein each of the actuators, e.g., $29_{[(M-i),(N-j)]}$, includes an electrostrictive member 31 having a top and a bottom surfaces 32, 33, a first electrode $16_{[(M-i),(N-j)]}$, a pair of second electrodes $14_{(M-i+1)}$, $14_{(M-i+1)'}$, each of the second electrode having a pair of side edges 41, 42 running parallel to each other and to the vertical direction, and a pair of insulating layers 26, the top surface 32 of the electrostrictive member 31 being evenly separated by a trench $18_{M-i}$ having a pair of side surfaces 43, 44 and a bottom surface 45 formed thereon and extending vertically across the top surface, thereby creating a first actuating member 34 having a first top surface 36 and a second actuating member 35 having a second top surface 37, the first electrode $16_{[(M-i),(N-j)]}$ being located on the bottom surface 33 thereof, each of the pair of second electrodes, being located on and partially covering the first top surface and the second top surface, one of the side edges thereof coinciding with one of the side surfaces of the trench $18_{M-i}$ and each of the pair of insulating layers 26 covering the top surface of each of the actuating members, including the pair of second electrodes $14_{(M-i+1)}$, $14_{(M-i+1)'}$ placed thereon ; an array 8 of M×N hinges, e.g., $20_{[(M-i+1),(N-j)]}$, $20_{[(M-i),(N-j)]}$, wherein each of the M×N hinges, e.g., $20_{[(M-i),(N-j)]}$, is provided with a flat top surface 21 and a bottom surface 22 having a protrusion 23 mounted on top of each of the M×N electrostrictive actuators, e.g., $29_{[(M-i),(N-j)]}$; and an array 24 of mirrors, e.g., $25_{[(M-i+1),(N-j)]}$, $25_{[(M-i),(N-j)]}$, $25_{[(M-i-1),(N-j)]}$, wherein each of the M×N mirrors, e.g., $25_{[(m-i),(N-j)]}$, is mounted on the top surface 21 of each of the M×N hinges, e.g., $20_{[(M-i),(N-j)]}$.

In this embodiment, an addressable driver (not shown) mounted on the bottom surface of the active matrix 15 may be employed to apply a voltage to each of the M×N first electrode in each of the M×N actuators for a desired tilting of the mirror. The voltage may be developed in accordance with the corresponding pixel intensity in an optical projection system.

Figure 3:
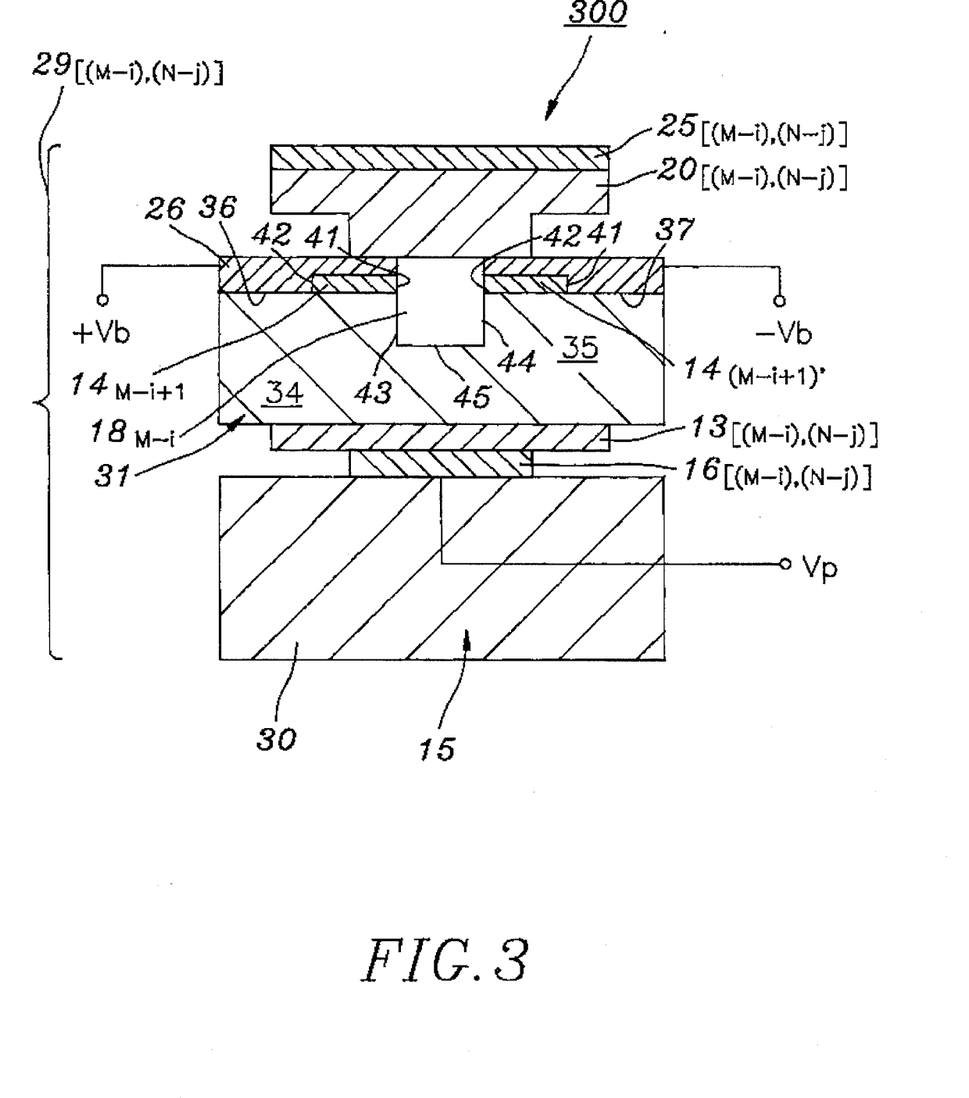
FIGS. 3 depicts cross sectional views of the inventive M×N piezoelectric and electrostrictive actuated mirror arrays, respectively.

In the inventive electrostrictive actuated mirror array the pair of second electrodes in each actuator function as the bias electrodes, the voltage $V_b$, applied thereto having the same magnitude but the opposite polarity, and the first electrode functions as the common signal electrode, the voltage, $V_p$, applied thereto being developed in accordance with a corresponding pixel intensity. In such an actuator, the amount of mechanical deformation the actuator will undergo, and, hence the degree of mirror tilting, is proportional to the difference between the bias voltages, $+V_b$, $-V_b$, applied to the pair of second electrodes and the signal voltage, $V_p$, applied to the first electrode. FIG. 3 illustrates a cross sectional view of the inventive M×N electrostrictive actuated mirror array 300.

While the present invention has been described with respect to certain preferred embodiments only, other modifications and variations may be made without departing from the scope of the present invention as set forth in the following claims.

What is claimed is:

1. A method for manufacturing an array of M×N electrostrictive actuated mirrors for use in an optical projection system, wherein M and N are integers, M indicating the total number of columns in the array, running parallel to the vertical direction and N indicating the total number of rows therein, running parallel to the horizontal direction, the method comprising the steps of:

(a) preparing a ceramic wafer, made of an electrostrictive material, having a top and a bottom surfaces;

(b) forming an array of M×N regularly spaced, identically sized first electrodes on the bottom surface of said ceramic wafer and a set of 2×(M+1) identically sized second electrodes on the top surface thereof, wherein each of the 2×(M+1) second electrodes, having a pair of side edges running parallel to each other and to the vertical direction, extends vertically across the top surface, and each of the M×N first electrodes, when projected onto the top surface, includes two adjacent second electrodes and the centerline thereof coincides with the centerline therebetween;

(c) mounting said ceramic wafer treated in accordance with said step (b) on an active matrix, including a substrate and an array of M×N connecting terminals to thereby connect each of the first electrodes with each of the M×N connecting terminals;

(d) covering the top surface of said ceramic wafer, including the 2×(M+1) second electrodes, treated in accordance with said steps (b) and (c) with an insulating layer;

(e) providing a set of (M+1) photoresistive necked segments on top of the insulating layer covering the top surface of said ceramic wafer, including the 2×(M+1) second electrodes, each of the photoresistive necked segments, extending in the vertical direction, is placed on a portion of the insulating layer covering a pair of second electrode, wherein the pair of second electrodes, when projected onto the bottom surface, is made up of two neighboring second electrodes from two horizontally adjacent first electrodes;

(f) forming a set of M trenches, wherein each of the M trenches, provided with a pair of side surfaces and a bottom surface, is located between two adjacent second electrodes, the centerline thereof coinciding with the centerline of each of the first electrodes on the same column and the centerline between the two adjacent second electrodes, runs parallel to the second electrodes, and is further provided with a set of N–1 grooves, running perpendicular thereto;

(g) removing the photoresistive necked segments;

(h) placing an array of M×N hinges on the top surface of said ceramic wafer treated in accordance with said steps (b), (c), (d), (e), (f) and (g), wherein each of the M×N hinges is provided with a top surface and a bottom surface provided with a protrusion mounted simultaneously on the insulating layers covering the two adjacent second electrodes separated by a trench therebetween;

(i) forming a mirror on the top surface of each of the M×N hinges; and (j) making appropriate electrical connections to thereby form an array of M×N electrodisplacive actuated mirrors.

2. The method of claim 1, wherein the M×N first electrodes and the 2×(M+1) second electrodes are formed by first sputtering the top and bottom surfaces of said ceramic wafer with a conductive metallization, and then obtaining the required electrode pattern using a photolithography method.

3. The method of claim 1, wherein the set of M trenches and the set of N–1 grooves formed on each trenches are obtained using an etching method.

4. The method of claim 1, wherein the mirror is formed on the top surface of each of the M×N hinges by sputtering a light reflecting material thereon.

5. An array of M×N electrostrictive actuated mirrors for use in an optical projection system, wherein M and N are integers, M indicating the total number of columns in the array, running parallel to the vertical direction, and N indicating the total number of rows in the array, running parallel to the horizontal direction, respectively, comprising:

an active matrix including a substrate, and an array of M×N connecting terminals thereon;

an array of M×N electrostrictive actuators, wherein each of the M×N electrostrictive actuators includes an electrostrictive member having a top and a bottom surfaces, a first electrode, a pair of second electrodes, each of the second electrode having a pair of side edges running parallel to each other and to the vertical direction, and a pair of insulating layers, the top surface of the electrostrictive member being evenly separated by a trench having a pair of side surfaces and a bottom surface formed thereon and running vertically across the top surface, thereby creating a first actuating member having a first top surface and a second actuating member having a second top surface, the first electrode being located on the bottom surface thereof, each of the second electrodes being located on and partially covering the first top surface and the second top surface, with one of the side edges thereof coinciding with the side surface of the trench, and each of the pair of insulating layers covering the first and second top surfaces of the actuating members, including the second electrode placed thereon;

an array of M×N hinges, wherein each of the M×N hinges is provided with a flat top surface and a bottom surface having a protrusion mounted on the top of each of the M×N electrodisplacive actuators;

an array of M×N connecting terminals, wherein each of the connecting terminals is used for electrically connecting each of the first electrodes with the active matrix; and an array of M×N mirrors, wherein each of the M×N, mirrors is mounted on the top surface of each of the M×N hinges.

6. The array of M×N electrostrictive actuated mirrors of claim 5, wherein the first and second electrodes are made of a conductive metallization.

7. The array of M×N electrostrictive actuated mirrors of claim 6, wherein each of the first electrodes, when projected onto the top surface of the electrostrictive member, includes the pair of second electrodes.

8. The array of M×N electrostrictive actuated mirrors of claim 7, wherein each of the pair of second electrodes functions as a first bias electrode and a second bias electrode, respectively.

9. The array of M×N electrostrictive actuated mirrors of claim 8, wherein a first bias voltage applied to the first bias electrode and a second bias voltage applied to the second bias electrode are of the same magnitude but of the opposite polarities.

10. The array of M×N electrostrictive actuated mirrors of claim 7, wherein the first electrode function as a common signal electrode.

11. The array of M×N electrostrictive actuated mirrors of claim 10, wherein a voltage applied to the first electrode is developed in accordance with a corresponding pixel intensity.

12. The array of M×N electrostrictive actuated mirrors of claim 5, wherein the insulating layers are made of either an oxide or a nitride.

13. The array of M×N electrostrictive actuated mirrors of claim 5, wherein the M×N hinges are made of an insulating epoxy.

14. The array of M×N electrostrictive actuated mirrors of claim 5, wherein the mirrors are made of a light reflecting material.

15. The array of M×N electrostrictive actuated mirrors of claim 5, wherein each of the connecting terminals is used for electrically connecting each of the first electrodes with the active matrix.

* * * * *